(12) United States Patent
Peters

(10) Patent No.: US 7,730,427 B2
(45) Date of Patent: ***Jun. 1, 2010

(54) DESKTOP MANAGEMENT SCHEME

(75) Inventor: Johan C. Peters, Sankt-Leon Rot (DE)

(73) Assignee: SAP AG, Walldorf (DE)

( * ) Notice: Subject to any disclaimer, the term of this patent is extended or adjusted under 35 U.S.C. 154(b) by 783 days.

This patent is subject to a terminal disclaimer.

(21) Appl. No.: 11/319,517

(22) Filed: Dec. 29, 2005

(65) Prior Publication Data

US 2007/0157125 A1 Jul. 5, 2007

(51) Int. Cl.
*G06F 3/048* (2006.01)
(52) U.S. Cl. ...................... 715/837; 715/810
(58) Field of Classification Search ................ 715/810, 715/837
See application file for complete search history.

(56) References Cited

U.S. PATENT DOCUMENTS

| | | | | |
|---|---|---|---|---|
| 5,416,901 | A * | 5/1995 | Torres | 715/835 |
| 5,479,599 | A * | 12/1995 | Rockwell et al. | 715/837 |
| 5,598,524 | A * | 1/1997 | Johnston et al. | 715/769 |
| 5,694,561 | A * | 12/1997 | Malamud et al. | 715/805 |
| 5,900,874 | A * | 5/1999 | Shrader et al. | 715/846 |
| 6,002,402 | A * | 12/1999 | Schacher | 715/810 |
| 6,208,344 | B1 * | 3/2001 | Holzman et al. | 715/846 |
| 6,469,722 | B1 * | 10/2002 | Kinoe et al. | 715/837 |
| 6,948,126 | B2 * | 9/2005 | Malamud et al. | 715/715 |
| 7,134,090 | B2 * | 11/2006 | Kodosky et al. | 715/769 |
| 7,188,316 | B2 * | 3/2007 | Gusmorino et al. | 715/764 |
| 2002/0055955 | A1 * | 5/2002 | Lloyd-Jones et al. | 707/512 |
| 2002/0126149 | A1 * | 9/2002 | Umeda | 345/769 |
| 2003/0169294 | A1 * | 9/2003 | Vatula et al. | 345/764 |
| 2005/0172261 | A1 * | 8/2005 | Yuknewicz et al. | 717/106 |
| 2005/0204309 | A1 * | 9/2005 | Szeto | 715/811 |
| 2005/0273729 | A1 * | 12/2005 | Kumashio | 715/825 |
| 2006/0101347 | A1 * | 5/2006 | Runov et al. | 715/764 |
| 2007/0150834 | A1 * | 6/2007 | Muller et al. | 715/810 |

FOREIGN PATENT DOCUMENTS

WO WO 2007030396 A2 * 3/2007

OTHER PUBLICATIONS

"Windows XP Fast & Easy", by Diane Koers, Published by Premie Press in 2002, pp. i, ii, iii, 1, 5, 7, 8, 10, 11, 37, 66, 119, 120, 130, 131, 132, 151, 152.*
"Direct Access to contained Objects via Pop-up (Context Menus)", IBM Technical Disclosure Bulletin by James et al., published Dec. 1, 1993, pp. 1, 167, 168.*
"Metada driven menus through hierarchical lists", Research Disclosure No. 448165, by IBM, published in Aug. 2001 by Kenneth mason Publications ltd., pp. 1-3.*
"Windows XP Fast & Easy", by Diane Koers, Published by Premier Press in 2002, pp. i, ii, iii, 133, 134, 153.*
Windows XP Fast & Easy, by Diane Koers, Published by Premier Press in 2002, pp. c, i, ii, 132, 133.*

* cited by examiner

*Primary Examiner*—William L Bashore
*Assistant Examiner*—Gregory A Distefano
(74) *Attorney, Agent, or Firm*—Kenyon & Kenyon LLP

(57) ABSTRACT

The present invention introduces a "contextual icon" to an icon-driven interface in which a single icon represents a shortcut to a suite of computer applications. The icon is associated with a single main application that may be invoked if an operator double-clicks on it or enters some other predetermined quick launch command. The desktop icon also may be associated with a context menu that reveals ancillary applications or tools that are related to the suite and typically are used less frequently than the main menu. The context menu may be opened with an ancillary interaction command (example: right clicking on the icon) and, thereafter, an operator may browse through and select an application from the context menu that may be desired. In this way, the contextual icon management scheme reduces desktop clutter while maintaining a highly intuitive navigation scheme among related applications.

25 Claims, 2 Drawing Sheets

100

200

300

DESKTOP MANAGEMENT SCHEME

BACKGROUND

The present invention is directed to a management scheme for computers and graphical user interfaces ("GUI") therefor. Specifically, the present invention is directed to a scheme for managing a suite of related application under an icon driven, point-and-click interface.

Modern computer systems use graphical user interfaces and icons to permit operators to use various applications largely without training. When used with a pointer device such as a mouse or a touch screen, the icons permit operators simply to point and click on an icon to start a computer application. The Microsoft Windows line of operating systems for personal computers and the Palm operating system for personal digital assistants are popular examples of commercially available icon-driven user interfaces. When a new application is installed on a computer, an installation wizard typically manages installation and configuration of the software files themselves. The wizard often places a new icon on the computer's "desktop," a computer workspace that is displayed when there are no open applications that overlay it, and additional entries in a pull up taskbar that may be opened on user command.

Increasingly, modern computer applications include not just a single application but a suite of integrated applications that are highly related. In such a circumstance, application designers may expect that operators will work routinely with a primary application ("the main application") and invoke secondary applications less frequently. To provide intuitive access to operators, the application designers may desire to provide desktop access to the secondary applications as well as the main application. Of course, provision of separate desktop icons tends to clutter the desktop itself. Over time, desktop icons can become intermixed with those of other applications. Operators tend to lose track of icons for infrequently used applications and may not remember that they are to be used in conjunction with a main icon.

Current user interfaces permit operators to collect a plurality of related applications in a folder (which often corresponds to storage space on a computer's file system) and to represent the folder as an icon on the desktop. This scheme is cumbersome, however, because it requires operators to progress through a multi-step navigation process to reach both frequently-used and infrequently-used applications. To start a frequently-used application, an operator typically must double click on a folder icon, which opens a folder window. The operator must identify and double click on an icon representing the frequently-used application to start it. The same process must be followed to access and open infrequently-used applications. This scheme is disadvantageous because it prevents convenient access to frequently-used applications, which is why desktop icons are provided in the first place.

Accordingly, there is a need in the art for a desktop management scheme that creates intuitive links among related applications and preserved the convenience of icon-driven interfaces.

DETAILED DESCRIPTION

The present invention introduces a "contextual icon" to an icon-driven interface in which a single desktop icon represents a shortcut to a suite of computer applications. The desktop icon is associated with a single main application that may be invoked if an operator double-clicks on it or enters some other quick key command. The desktop icon also may be associated with a context menu that reveals ancillary applications or tools that are related to the suite and typically are used less frequently than the main menu. The context menu may be opened with an ancillary command (example: right clicking on the icon) and, thereafter, an operator may browse through and select an application from the context menu that may be desired. In this way, the contextual icon management scheme reduces desktop clutter while maintaining a highly intuitive navigation scheme among related applications.

Figure 1:
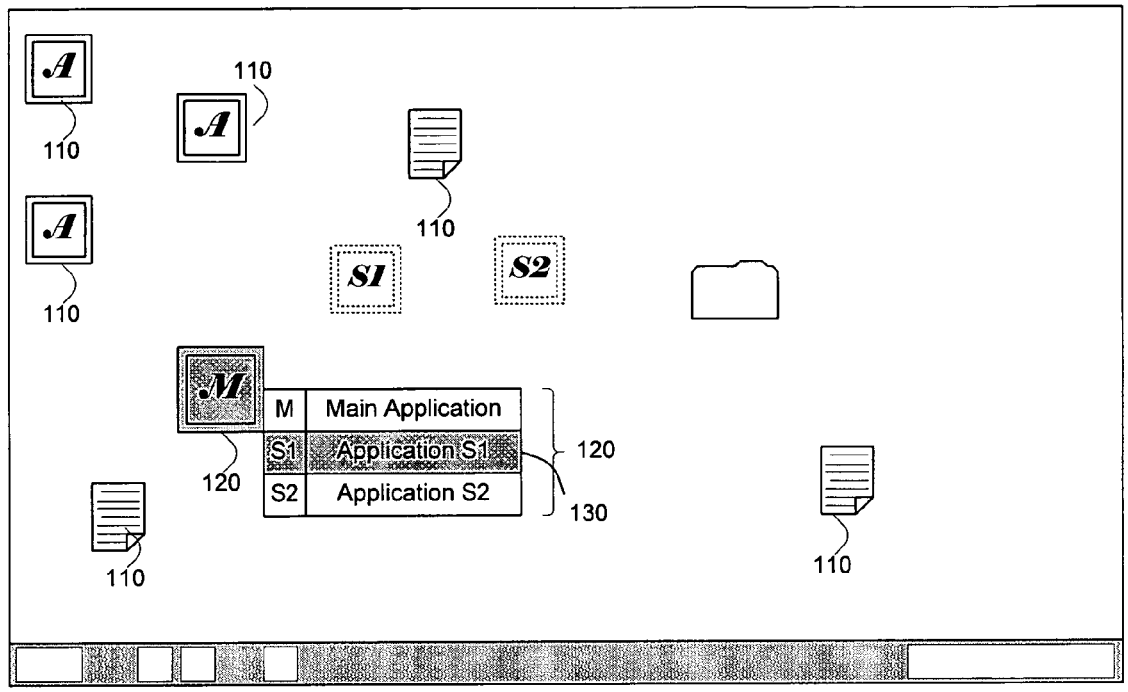
FIG. 1 illustrates an exemplary desktop of an icon-driven user interface according to an embodiment of the present invention.

FIG. 1 illustrates an exemplary desktop 100 according to an embodiment of the present invention. There, the desktop is illustrated to include a plurality of icons 110 according to the present invention. Icons may represent shortcuts to applications, documents or other objects in a manner that is consistent with current commercially available icon-driven interfaces. The desktop also may include taskbars, system trays and other interface objects as may be known in the art.

A contextual icon is illustrated in FIG. 1 as 120. In an ordinary view, the contextual icon may look like any other icon on the desktop. That is, the icon is a graphical symbol that is identified with an application (here, a suite of applications). When an operator double-clicks upon the contextual icon 120 or enters some other quick key command, the operating system opens a primary application. Thus, the contextual icon retains the convenience of ordinary icons. When an operator enters an ancillary command using the contextual icon, however, the operating system opens a context menu 130, which lists a plurality of applications or other tools available in the related suite of applications. Typically, the menu lists both the main application itself and secondary applications (shown as S1 and S2). An operator may select a desired application by clicking on it and the operating system opens the selected application. In this manner, the present invention avoids the necessity of providing separate icons on the desktop 100 for all the applications included in the suite. Without the benefits of the present invention, secondary applications S1 and S2 would have their own desktop icons (shown in phantom in FIG. 1).

Figure 2:
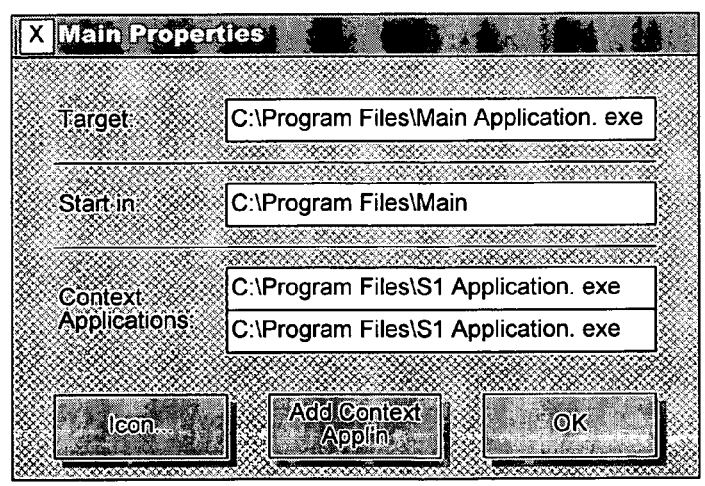
FIG. 2 illustrates an exemplary properties record for an icon in an icon-driven user interface.

FIG. 2 illustrates a properties record 200 of a contextual icon according to an embodiment of the present invention. The properties record 200 includes pointers to locations in a computer's storage space where the main and subordinate applications may be found. For example, in FIG. 2, the target field may represent a pointer to the main application (main application.exe). The Context Application fields may include pointers to secondary applications, S1 Application.exe and S2 Application.exe. The Context Application fields may be built as a linked list data structure, which permits the fields to be extended to include as many pointers as may be desired to reference as many secondary applications as may be needed for a given implementation. These features of the properties record 200 may be integrated with feature of convention records, such as functionality to select an icon to be displayed.

Figure 3:
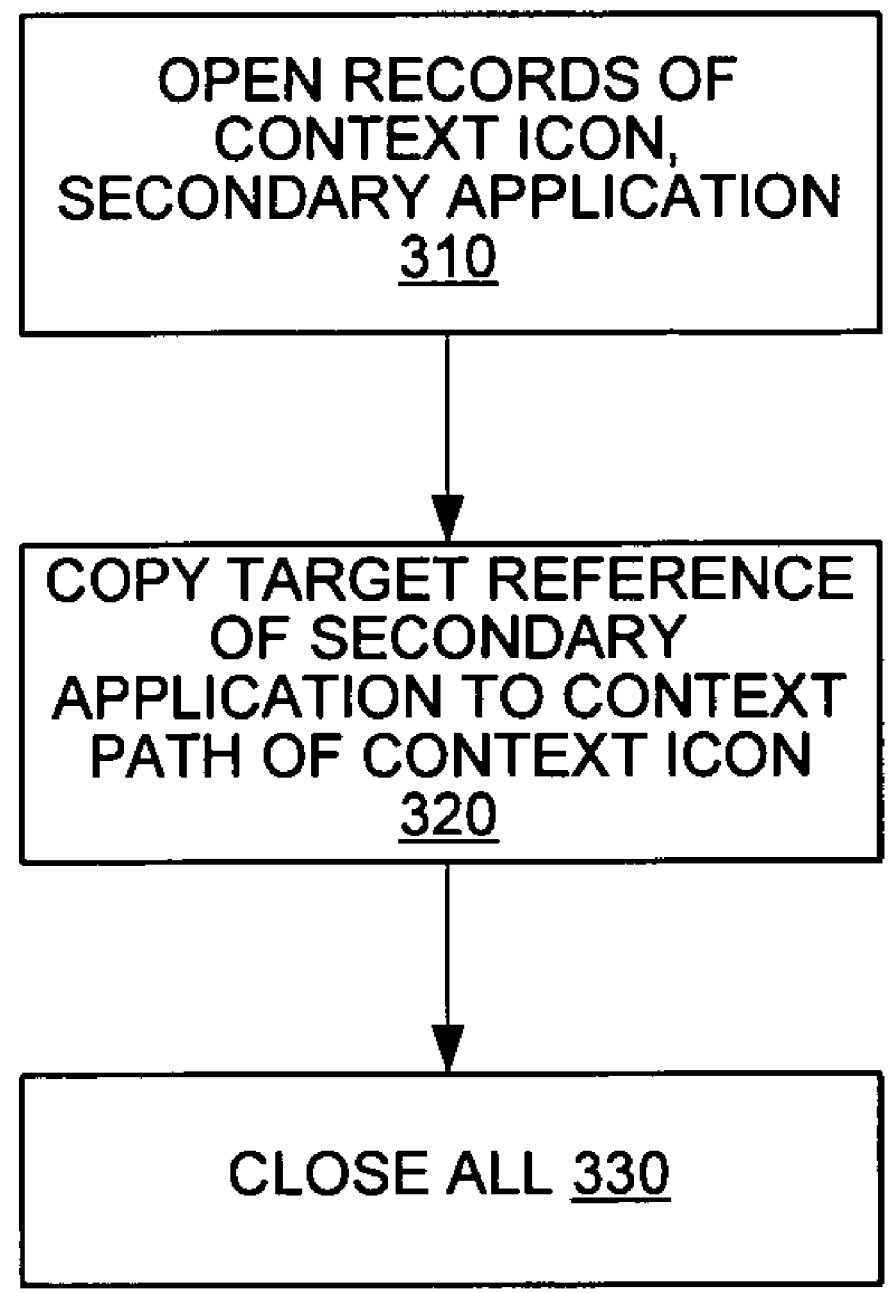
FIG. 3 illustrates a method according to an embodiment of the present invention.

Embodiments of the present invention provide an intuitive system for assembling context icons from traditional desktop icons or other items in the computer's workspace. For example, to add a secondary application to a context icon, it may be sufficient merely to drag an icon representing the secondary application to the context icon in a drag-and-drop manner. Such a method is illustrated in FIG. 3, in which the operating system interprets the drag-and-drop operation as a command to associate the secondary application with the context icon. In so doing, the system opens the records of both icons (box 310) and copies target reference information of the secondary application from the application's own icon to the context icon (box 320). The addition operation is then complete and the system closes both records (box 330). If the icon of the secondary application was selected from the desktop, it may be deleted from the desktop in a manner that is analogous to a move operation. If the secondary application's icon was selected from a folder, however, the operating system simply may leave the icon untouched in the folder, operating as a copy operation instead of a move.

At the time of this writing, the Windows 2000 operating system available from Microsoft Corp. displays a static menu when operators right click on desktop icons. For icons that represent applications, the menu offers operating system command selections such as "run," "open," "send as" etc. According to an embodiment of the present invention, right clicking on a context icon from the desktop may display an aggregate menu that includes selection representing primary and secondary applications associated with the icon as well as the traditional set of operating system commands.

Although the foregoing description has presented context icons as elements of a desktop system, the principles of the present invention may be extended to other constructs of a computer's operating system. For example, context icons may be stored in folders, in pull down/pull up menus or in system trays of a user interface. The context icons find application in a computer construct where traditional single-applications icons may be employed.

I claim:

1. A computer readable storage medium storing instructions for an icon-driven user interface for a computer system comprising:

creating, after an icon associated a secondary application program is dragged and dropped over an icon associated with a main application program, a context icon, wherein a quick launch command asserted on the context icon causes launch of the main application program, and an interaction command asserted on the context icon causes the user interface to open a context menu displaying at least one entry corresponding to the secondary application program associated with the context icon, wherein a quick launch command asserted on a context menu entry causes a launch of the secondary application program corresponding to the asserted context menu entry.

2. The computer readable storage medium of claim 1, wherein the quick launch command is a double click entered through a pointer device of a computer system.

3. The computer readable storage medium of claim 1, wherein the interaction command is a right click entered through a pointer device of a computer system.

4. The computer readable storage medium of claim 1, wherein the context icon is provided on a desktop of the user interface.

5. The computer readable storage medium of claim 1, wherein the context icon is provided in a folder of the user interface.

6. The computer readable storage medium of claim 1, wherein the context icon is provided in a pull down menu of the user interface.

7. The computer readable storage medium of claim 1, wherein the context icon is provided in a pull up menu of the user interface.

8. The computer readable storage medium of claim 1, wherein the context icon is provided in a system tray of the user interface.

9. The computer readable medium of claim 1, wherein
the context icon stores pointers as metadata to locations in a computer storage system of the associated main and secondary application programs' executable files, and when the user interface opens the context menu, it reads the pointer metadata and displays menu entries for as many secondary applications as are identified within the pointer metadata.

10. The computer readable medium of claim 9, wherein
a target field in a properties record of the context icon contains a pointer to an executable file of the main application, and
context application fields in the properties record contains pointers to executable files of secondary application programs.

11. The computer readable medium of claim 9, wherein a number of pointers to secondary applications is user controlled.

12. The computer readable medium of claim 1, wherein the context menu identifies the secondary application by name.

13. A computer system, comprising:
integrated processor, memory and display apparatus,
the processor operating through program instructions to render an icon-based graphical user interface (GUI) via the display, creating, after an icon associated with a secondary application program is dragged and dropped over an icon associated with a main application program, a context icon therein providing navigation pathways to the main application program and the secondary application program, wherein
a quick launch command asserted on the context icon causes launch of the main application program,
an interaction command asserted on the context icon causes the user interface to open a context menu displaying at least one entry corresponding to the secondary application program associated with the context icon, and
a quick launch command asserted on a context menu entry causes a launch of the secondary application program corresponding to the asserted context menu entry.

14. The computer system of claim 13, wherein
a first navigation pathway is a quick launch command entered by a double-click of a pointer device against the context icon and
a second navigation pathway is a right click entered through the pointer device of against the context icon.

15. The computer system of claim 13, wherein the context icon is provided on a desktop of the user interface.

16. The computer system of claim 13, wherein the context icon is provided in a folder of the user interface.

17. The computer system of claim 13, wherein the context icon is provided in a pull down menu of the user interface.

18. The computer system of claim 13, wherein the context icon is provided in a pull up menu of the user interface.

19. The computer system of claim 13, wherein the context icon is provided in a system tray of the user interface.

20. A management method for an icon-based user interface of a computer system, comprising:

when a first icon associated with a first application program of the user interface is moved over a second icon associated with a second application program by a drag and drop operation, replacing the first and second icons with a context icon, the context icon having command pathways to each of the application programs formerly represented by the icons, wherein a quick launch command asserted on the context icon causes launch of the main application program, an interaction command asserted on the context icon causes the user interface to open a context menu displaying at least one entry corresponding to the secondary application program associated with the context icon, and a quick launch command asserted on a context menu entry causes a launch of the secondary application program corresponding to the asserted context menu entry.

21. The management method of claim 20, further comprising, in response to another drag and drop operation performed with respect to a third icon and the context icon, deleting the third icon from the user interface and adding a command pathway to the context icon that references an application program formerly represented by the third icon.

22. The management method of claim 20, further comprising, storing, as metadata of the context icon, pointers to locations in a computer storage system of application program executable files formerly associated with the first and second icon.

23. The method of claim 20, wherein the replacing comprises:

opening properties records of the first and second icons, and copying to a properties record of the context icon target reference information from the first and second icons pointing to executable files of application programs respectively associated with the icons.

24. A management method for an icon-based user interface of a computer system, comprising:

creating, after a first icon associated with a secondary application program is dragged and dropped over a second icon associated with a main application program, a context icon replacing the first and second icons, the context icon having command pathways to the main application program and the secondary application program, wherein a quick launch command asserted on the context icon causes launch of the main application program, an interaction command asserted on the context icon causes the user interface to open a context menu displaying at least one entry corresponding to the secondary application program associated with the context icon, and a quick launch command asserted on a context menu entry causes a launch of the secondary application program corresponding to the asserted context menu entry.

25. The management method of claim 24, further comprising, in response to the drag and drop operation performed with respect to an first icon and the second icon, deleting the first icon from the user interface and adding a command pathway to the context icon that references an application program formerly represented by the other icon.

* * * * *